Nov. 12, 1968   J. P. KNIGHT   3,410,061
FILTER BAG AND SUSPENSION THEREFOR
Filed Sept. 9, 1966
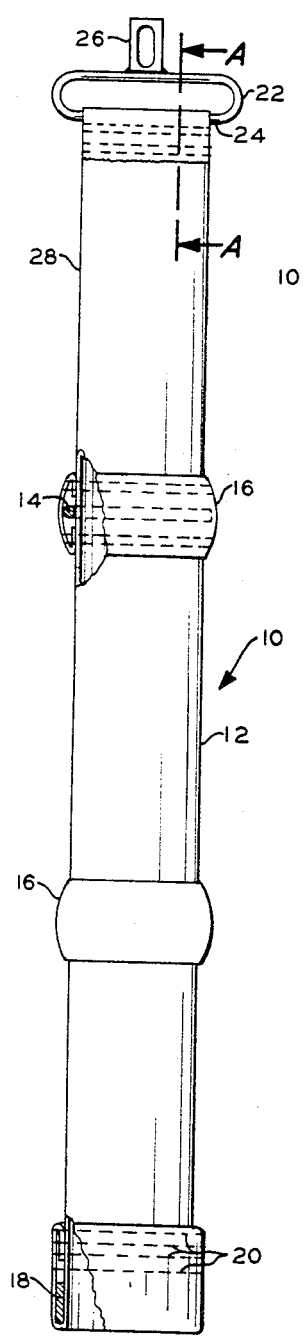
FIG. 1
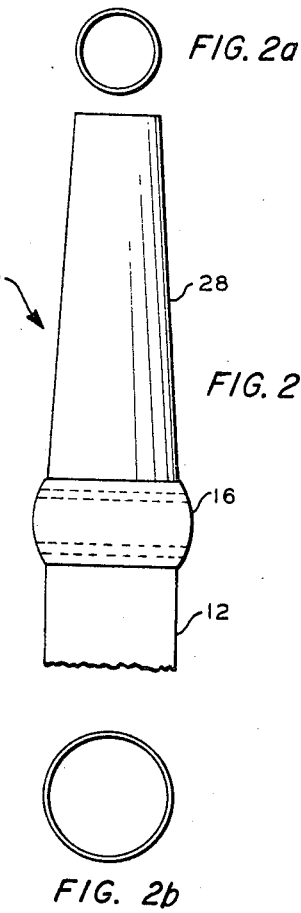
FIG. 2a
FIG. 2
FIG. 2b
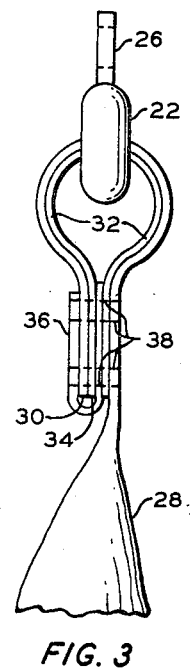
FIG. 3
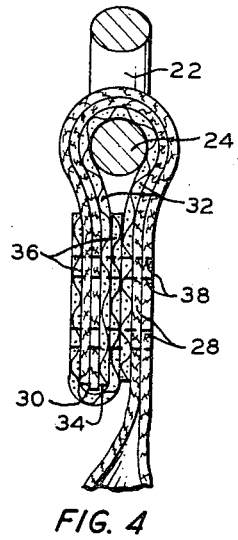
FIG. 4
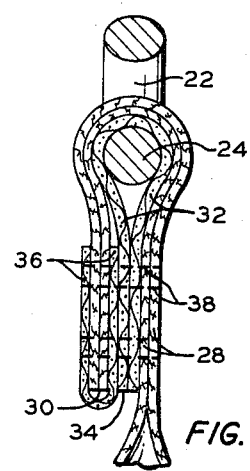
FIG. 5
INVENTOR
J. P. KNIGHT
BY *Young & Quigg*
ATTORNEYS United States Patent Office 3,410,061
Patented Nov. 12, 1968

3,410,061
FILTER BAG AND SUSPENSION THEREFOR
Jack P. Knight, Borger, Tex., assignor to Phillips
Petroleum Company, a corporation of Delaware
Filed Sept. 9, 1966, Ser. No. 578,401
4 Claims. (Cl. 55—378)

ABSTRACT OF THE DISCLOSURE

A filter bag formed of woven fiber glass tubing is provided with a hanger and closure combination for its upper end comprising a metal ring member having a straight section along one side at least as long as the width of the flattened upper end section of the bag and means on the opposite side for hanging on a support, said flattened upper end section passing thru the ring and being backfolded over itself to enclose the straight section of the ring and provide a stitching area below said ring, asbestos cloth being disposed in contact with the ring on the inside of the loop formed by the backfold to insulate the fiber glass in the loop from the ring, another layer of asbestos cloth being disposed outside of the backfolded stitching area, and at least one row of stitching being made thru the asbestos and fiber glass in the stitching area.

---

This invention relates to a cloth filter bag and means for suspension thereof.

The separation of particulate solids from gases containing same is effected in bag filters utilizing upright, cloth filter bags having an open bottom end communicating with a feed compartment and a closed upper end, the bags extending from chimneys in a wall separating the feed compartment from the superimposed filtering compartment. Such a bag filter and filtering process are disclosed in the U.S. patent to Larson, 3,243,940. In filtering hot carbon black, woven fiber glass is the most efficient filter bag material and is used substantially exclusively in the carbon black filtering art. One of the problems encountered in the use of glass filter bags in carbon black filtering at temperatures in the rang of about 350–500° F. lies in providing an efficient suspension means for the bag which does not cause deterioration of the fiber glass cloth in the area of contact with the suspending means. In plant operation it has been found that contact of the filtering cloth with the metal of the suspending means causes deterioration and breakage of the fiber glass and material shortening of the bag life.

This invention is concerned with a hanger arrangement and bag structure which alleviates the problem of deterioration of the bag at the hanger means.

Accordingly, it is an object of the invention to provide a cloth filter bag and suspension structure which extends the life of a filter bag. Another object is to provide a fiber glass filter bag and suspension arrangement, assembly, or structure which prevents abnormal deterioration of the bag at the area of the suspension. A further object of the invention is to provide a suspension means for a fiber glass filter bag which is simple, insulates the fiber glass from the metal of the hanger, and prevents unravelling or fraying of the fiber glass cloth at the end of the bag. Other objects of the invention will become apparent to one skilled in the art upon consideration of the accompanying disclosure.

A broad aspect of the invention comprises a support ring having means on one side for attaching to an overhead support and a straight ring section on the other side at least as long as the width of the flattened end of the bag, the flattened end of the bag being passed thru the ring over the straight section and backfolded over the flattened upper end of the bag below the ring to provide a substantial stitching area below the ring. A loop of asbestos cloth is passed over the ring inside the loop of the bag to protect the bag material from the heat of the ring and friction therewith. At least one layer of asbestos cloth covers the outside of the backfolded bag end for stitching security. It is preferred to use another loop of asbestos cloth extending over and enclosing the raw ends of the flattened bag top, covering the backfolded section thereof. Several transverse rows of stitching thru all 4 layers of the bag and all 4 layers of the asbestos cloth pass thru the stitching area to fasten the folded assembly. The loop of asbestos cloth backfolded over the raw edges of the flat-folded bag end may either interlock with or overlap the inside loop of asbestos cloth encircling the straight section of hanger or it may be backfolded directly over the folded end of the bag outside of the first loop of asbestos cloth insulating the bag from the ring.

The invention is better understood by reference to the accompanying schematic drawing of which FIGURE 1 is an elevation in partial section of an upright bag and hanger assembly illustrating a preferred embodiment of the invention; FIGURE 2 is an elevation of the upper end section of a tubular fiber glass bag in expanded form before flattening and closing the upper end and attaching the hanger means thereto; FIGURE 3 is an enlarged elevation of the upper end of the bag of FIGURE 1 rotated 90°; FIGURE 4 is a vertical cross section taken on the line A—A of FIGURE 1; and FIGURE 5 is a view similar to that of FIGURE 4 showing another embodiment of the attaching structure.

Referring to FIGURE 1, a filter bag 10 formed from a cylindrical, tubular member 12 is provided with a plurality of rings 14 encircling the bag and held in place by an overlapping ring of bag material 16 (fiber glass) designed to hold the bag in substantially expanded form (after loading the inside walls with filtered-out carbon black) during backpressuring to remove the carbon black from the inside walls, the black dropping thru the lower open end of the bag. A flat, split ring 18 is positioned around the lower end of the bag and the bag is backfolded over the ring and stitched at 20 to hold the ring in place. This provides a means for attaching the ring and lower end of the bag to a chimney in the partition between the filtering compartment and the feed compartment leading to the chimneys. The lower end of the bag is slipped over the chimney and a clamping band is raised to encircle the ring 18 and clamp same to the chimney.

A support ring 22 in the form of a metal rod of circular cross section having an elongated straight section 24 on one side and attaching means 26 on the opposite side is attached to the upper end of the bag in the manner illustrated more clearly in FIGURES 3, 4, and 5, described below.

Referring to FIGURES 2, 2a and 2b the upper end 28 of bag 10 is tapered inwardly toward the top of the bag, or is frusto conical in shape, the lower end being the same diameter as the main bag section 12 and the upper end being of smaller diameter so that the flattened bag end has a width substantially equal to the diameter of the open main bag section 12 maintained in open position by ring structure 16. Thus, in the view illustrated in FIGURE 1, the upper end of the bag has the same width as the diameter of the main bag section but in FIGURES 3, 4, and 5, the flattened structure is apparent. In a specific embodiment of the bag structure, section 12 has a 5¼″ O.D. (outside diameter), while the upper end of the bag has a 3½″ O.D. Thus, when the upper end is flattened, the width of the flattened end is approximately the diameter of the main bag section, particularly through ring structure 16, so that the space between bags is more uniform than would otherwise be the case.

Referring to FIGURE 3, the upper section 28 of the bag is flattened at the extreme end and looped over support ring or hanger 22 so that the raw edges 30 of the bag end are backfolded over the flat section of the bag below the hanger. A first loop of asbestos cloth 32 is positioned inside the bag and looped over hanger 22 and extends down to 34. A second loop of asbestos cloth 36 extends along the outer surface of the backfolded bag end, around the ends 30 and 34, and upwardly inside of first loop 32. Several rows of stitching 38 extend through all 4 layers of fiber glass cloth and all 4 layers of asbestos cloth to fasten the assembly firmly together.

Referring to FIGURE 4, the double-walled bag structure 28 on each side of the bag loop encircling hanger section 24 can be seen. The first loop of asbestos cloth 32 is shown encircling hanger section 24 inside of the bag loop. Also, the second loop of asbestos cloth 36 can be seen extending along the outside of the assembly and upwardly on the inside, with the raw edges 30 of the bag and the innermost section of the first loop enclosed within the second loop of asbestos cloth.

Referring to FIGURE 5, the structure differs from that of FIGURE 4 in that the second loop of asbestos cloth 36 is first positioned over the raw edges 30 of the flattened bag end and backfolded along the flattened bag without enclosing the first loop of asbestos cloth 32 which is then positioned on the flattened end of the bag overlapping the innermost section of second loop 36, after which the resulting structure is looped over ring section 24 and backfolded as shown. Stitching 38 is then applied thru all 4 layers of bag wall and thru all 4 layers of asbestos cloth to firmly fix the resulting assembly and attach the bag end to the ring 22. It is within the scope of the invention to utilize more than one thickness of asbestos cloth in either or both loops of the structure. However, a large number of fiber glass filter bags constructed substantially in accordance with the invention, utilizing the embodiment of FIGURE 5, have been in use for an extended period in a carbon black plant and have demonstrated much longer life than the conventional hook or cap assembly supports of the prior art.

The asbestos loops in the fastening assembly have several functions which materially extend the life of the support assembly. The first loop extending over the metal hanger provides a soft contact between the fiber glass of the bag and the metal of the hanger, which is in the form of a round rod to reduce the strain on the fiber glass. This asbestos loop also reduces the heat transfer from the metal rod to the fiber glass under conditions in which the ambient temperature is rising. Another problem which the asbestos cloth overcomes is that of the tendency of woven fiber glass to become frayed or unraveled near the raw edges of the bag end when stitched. Thus, loop 36 encloses the raw edges of the end of the bag to prevent unravelling thereof and, by overlaying the fiber glass near the end of the bag, renders the stitching more solid and more permanent than without the asbestos cloth.

I claim:
1. Apparatus comprising in combination:
 (a) a filter bag formed from a woven fiber glass cloth tube originally open at both ends, said bag being suitable for extended use in filtering gas at a temperature in the range of 350 to 500° F;
 (b) a metal hanger having a straight section of round rod along one side at least as long as the flattened width of bag end recited in (c) and means on the opposite side for hanging on a support;
 (c) a flattened double-walled section of the uppermost end of said bag forming a loop over the rod of the hanger of (b) backfolded over itself to provide a substantial area for stitching the backfolded to the flattened section, said straight section of round rod extending completely through said loop;
 (d) at least one loop of asbestos cloth within the bag loop formed in (c) encircling the rod of the hanger of (b) in contact therewith to insulate said bag from said hanger, said loop of asbestos cloth extending at both ends substantially below said hanger extending transversely completely across said backfolded section of (c) through said stitching area;
 (e) at least one layer of asbestos cloth on the outside of the backfolded end section of (c) below said hanger in said stitching area; and
 (f) at least one row of stitching in said stitching area thru the overlapping sections of the layers of asbestos of (d) and (e) and the 4 thicknesses of bag intermediate the overlapping end of the bag and said hanger to form a closed loop.

2. The bag and structure of claim 1 wherein said means of (b) comprises a plate having a hole therein attached to the outside of said hanger opposite said round rod of (b) and said at least one layer of asbestos cloth of (e) comprises a length of said cloth about the width of the folded bag-end extending longitudinally from adjacent said hanger around the raw edges of the flattened end of said bag and backfolded to the proximity of said hanger to provide 4 layers of said asbestos cloth for stitching, and multiple rows of stitching are sewn therein.

3. The bag and structure of claim 2 wherein the backfolded section of asbestos cloth lies within the loop of asbestos cloth of (d).

4. The bag and structure of claim 2 wherein the upper end section of said bag is tapered inwardly toward the top of the bag so that the width of the folded end is substantially the diameter of the bag below the tapered section and including a ring of substantially said diameter attached to said bag at the confluence of said tapered section with the larger diameter section of the bag, a ring at the other end of said bag holding same open, and at least one intermediate ring holding the midsection of said bag open.

References Cited

UNITED STATES PATENTS

| | | | |
|---|---|---|---|
| 1,968,436 | 7/1934 | Bishop | 55—482 |
| 2,056,831 | 10/1936 | Daniels et al. | 55—381 |
| 2,143,664 | 1/1939 | Snyder | 55 |
| 2,732,030 | 1/1956 | Dorfan | 55—304 |
| 2,927,659 | 3/1960 | Pabst et al. | 55—377 |
| 2,981,368 | 4/1961 | Johnson | 55—379 |
| 3,243,940 | 4/1966 | Larson | 55—96 |

HARRY B. THORNTON, *Primary Examiner.*

B. NOZICK, *Assistant Examiner.*